US007109417B1

(12) United States Patent
Beam

(10) Patent No.: US 7,109,417 B1
(45) Date of Patent: Sep. 19, 2006

(54) ROLL OVER AUDIO VISUAL CONTROL CENTER

(75) Inventor: John Wade Beam, Chicago, IL (US)

(73) Assignee: FCI, Inc., IL (US)

( * ) Notice: Subject to any disclaimer, the term of this patent is extended or adjusted under 35 U.S.C. 154(b) by 0 days.

(21) Appl. No.: 11/107,471

(22) Filed: Apr. 18, 2005

(51) Int. Cl.
*H02G 3/08* (2006.01)

(52) U.S. Cl. .................. 174/52.1; 312/223.3; 361/809

(58) Field of Classification Search ............... 174/52.1; 312/223.3; 361/809, 807
See application file for complete search history.

(56) References Cited

U.S. PATENT DOCUMENTS

| | | | | |
|---|---|---|---|---|
| 4,562,482 | A * | 12/1985 | Brown | 348/836 |
| 5,480,224 | A * | 1/1996 | Ugalde | 312/194 |
| 5,662,395 | A * | 9/1997 | Lechman | 312/194 |
| 5,746,489 | A * | 5/1998 | Moon | 312/223.3 |
| 5,758,934 | A * | 6/1998 | Flutka et al. | 312/223.3 |
| 5,758,935 | A * | 6/1998 | Coonan | 312/223.3 |
| 6,170,926 | B1 * | 1/2001 | Roberts et al. | 312/194 |
| 6,286,440 | B1 * | 9/2001 | Jyringi | 108/50.01 |
| 2001/0007523 | A1 * | 7/2001 | Rooyakkers et al. | 361/681 |
| 2002/0089268 | A1 * | 7/2002 | Gosling | 312/195 |
| 2004/0075373 | A1 * | 4/2004 | Gershfeld | 312/223.3 |
| 2004/0150300 | A1 * | 8/2004 | Wyatt | 312/223.3 |
| 2005/0047074 | A1 * | 3/2005 | Shearman | 361/683 |

* cited by examiner

*Primary Examiner*—Hung V. Ngo
(74) *Attorney, Agent, or Firm*—Basil E. Demeur; Alan B. Samlan; David J. Hurley

(57) ABSTRACT

A roll over audio visual control center ("roll over platform") designed to be embedded for use within the top of a conference table to display, in an inverted position, a power or communications outlet for use on top of the conference table or to hide, in a regular position, the power or communications outlet under the conference table when not in use. The roll over platform consists of two main parts: a housing and a control center. The housing is rectangular in shape and forms a hollow center. The control center approximates the rectangular shape of the housing and is secured within the hollow center of the housing by a hinge. The hinge enables the rotation of the control center within the hollow center of the housing. The roll over platform further consists of a means to secure the control center to the housing to enable the regular and inverted positions of the control center with respect to the housing.

14 Claims, 4 Drawing Sheets

FIG. 1
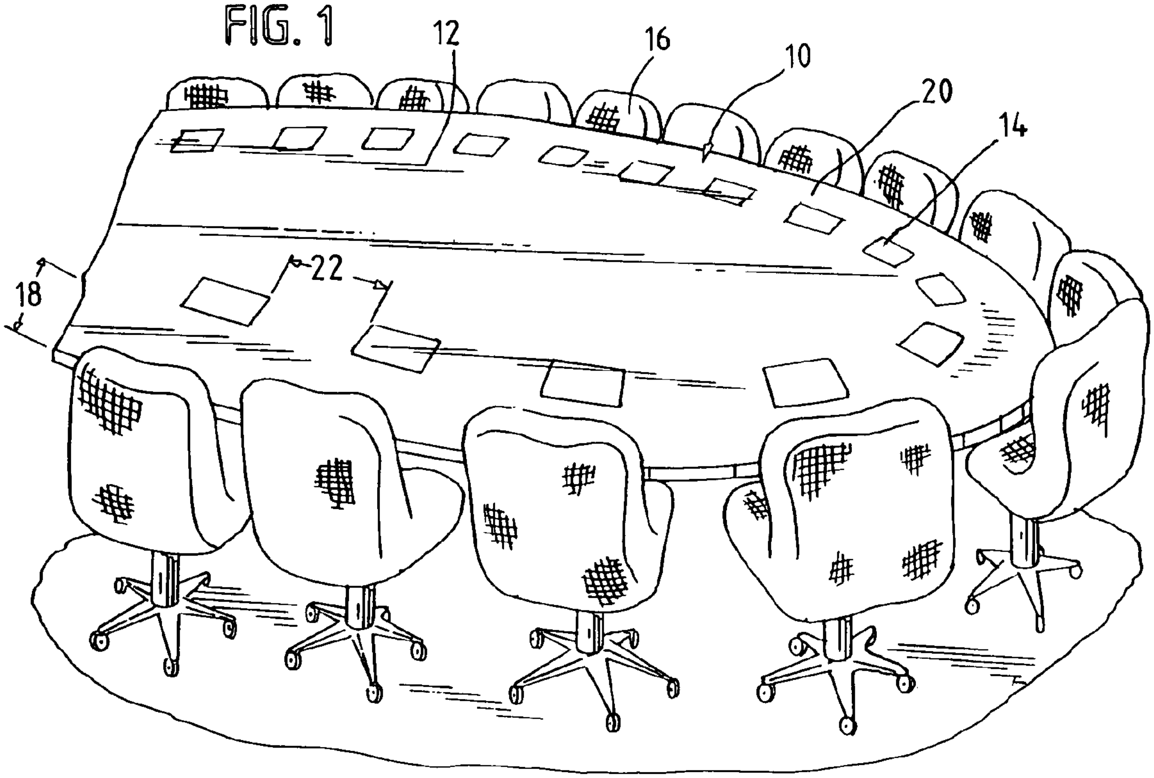
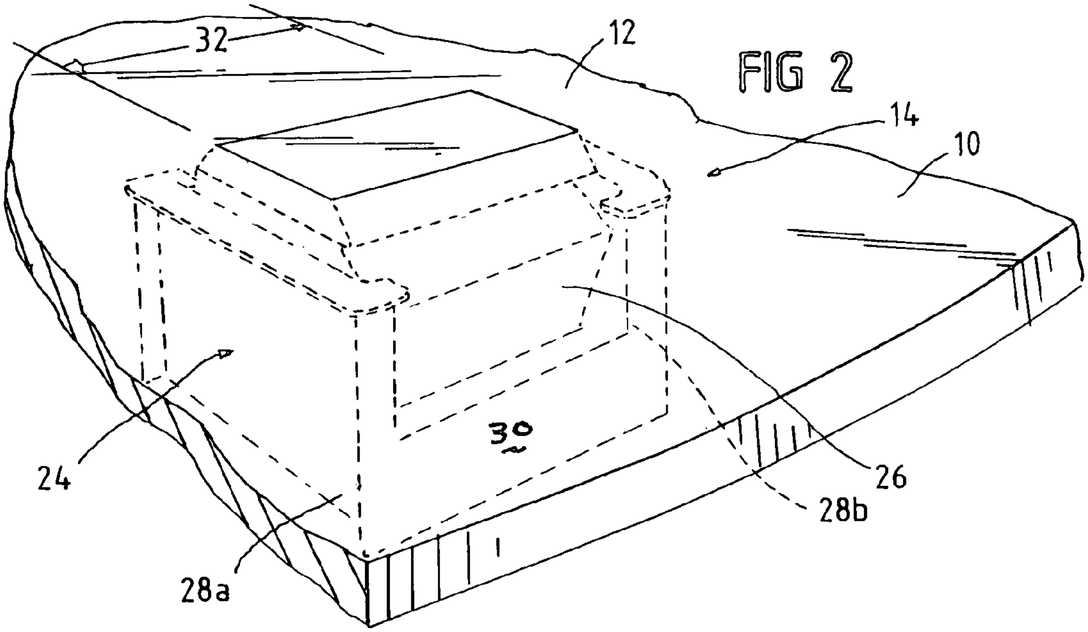
FIG 2

ROLL OVER AUDIO VISUAL CONTROL CENTER

I. FIELD OF THE INVENTION

The present invention relates to conference tables and, more particularly, to a platform that is imbedded within a conference table to enable rotation within the conference table to display or hide an audio visual control center as desired.

II. DESCRIPTION OF THE PRIOR ART

Conference tables have become and remain a primary form of equipment in the facilitation of meetings and discussions between groups of business, legal, and/or other entities. Due to the demand and increased versatility, conference tables are designed to accommodate a significant number of individuals for these meetings and discussions. The individuals that attend these meetings and discussions are themselves equipped with hard copy information relevant to the anticipated topics for discussion and, with the advent of the electronic era, are equipped with some form of computer equipment whether hand-held, laptop, or some other form.

Yet, with so many individuals at these meetings and discussions and all the information each has available to present to the other individuals at the meeting, one problem continues to plague these meeting and discussions: the individuals at the meetings do not have access to power outlets for their computer equipment and/or access to communication outlets to the network, internet, or other related mediums.

A number of different inventions have been designed for use in conference tables for such meetings and discussions. However, none of the prior art patents solve the current access problems presented in the conference meetings.

For example, U.S. Pat. No. 6,028,267 to Byrne entitled "Rotatable Power Center System" discloses a rotatable carriage with a power center system that includes electrical and communication components. The carriage is mounted and housed in furniture assemblies and the like and provides an open and closed position. In the open position, the carriage is rotated an acute angle to expose the electrical and communication components. The cover of the carriage is provided with a hinge along the center of the cover such that the front and rear portions may rotate relative to each other and thereby permit the exposure of the components. In the closed position, the surface is relatively flat, except for the hinge, with respect to the surface of the furniture assemblies. The cover is also provided with slots to permit the carriage to remain in the closed position while the cords and lines remain energized by the components.

Likewise, U.S. Pat. No. 5,575,668 to Timmerman entitled "Temporary Power/Data Tap" discloses a self-contained unit that is mounted on a pivoting outlet enclosure housed inside an enclosure assembly. The unit is permitted to pivot in relation to the enclosure assembly to reveal the electrical receptacle and data port. The electrical receptacle and data port are disposed in two separate compartments formed in the outlet enclosure. Similarly, U.S. Pat. No. Des 421,961 to Muller entitled "Electrical Receptacle Housing" discloses an electrical receptacle housed within an enclosure.

U.S. Pat. No. 5,709,156 to Gevaert entitled "Flip-Up Electrical And Communications Device for Use in Combination With A Worksurface" illustrates a utility receptacle assembly which includes a base that is mounted to the surface of a workstation, a utility receptacle member to receive and energize electrical and communication components, and a cover. The cover provides a top surface of the device. In the closed position, the cover includes a finger notch to rotate the cover approximately 90° to expose the utility receptacle assembly for use.

U.S. Pat. No. 5,230,552 to Schipper et al. entitled "Worksurface Utilities Module: discloses a module which includes a housing that is pivotally mounted within an aperture in a worksurface. The module includes a top surface that protects and hides the housing. The housing is pivotal between an open position to provide a hollow interior to receive a plurality of utility connector modules and a closed position to substantially hide the retracted receptacle.

U.S. Pat. Nos. Des 412,698 and Des 406,102 to Byrne entitled "Large Lift-Up With Cover" and "Double Lift Up Device", respectively, both disclose a row of electrical and communication components that are housed within a table. The devices are provided with a top cover that blends in with the top surface of the table. The cover includes a slot to lift and expose the row of electrical and communication components in either a vertical or horizontal position.

Although the above prior art patents disclose rotatable assemblies to expose electrical and communication components, none of the prior art discloses a roll over audio visual control center ("platform") that enables rotation to display the control center to solve the access problems in the conference meetings. Another inherent shortcoming of the prior art patents is that the assemblies do not enable rotation with respect to the conference table to position the assembly on the top of the table in the same manner as if designed within the top of the conference table for such use. Another inherent shortcoming of the prior art patents is that the assemblies do not efficiently provide the ability to retract and hide the assembly for an individual not using the assembly during the meeting or when the meeting is not in session. The assemblies of the prior art patents do not efficiently permit the assemblies to be continually activated for use without being disrupted during the unlimited rotation of the assembly with respect to the conference table. More importantly, the prior art assemblies do not allow for changes, additions or deletions from the control center in terms of the plugs, ports, telephone lines, screens and the like.

Thus, there is a need, therefore, and there has never been disclosed a roll over audio visual control center having multiple ports, lines, screens and the like, that is embedded within a conference table and enables rotation within that conference table to effectively display or hide a control center as desired.

III. OBJECTS OF THE INVENTION

It is the primary object of the present invention to provide a platform that is embedded within a conference table and is rotatable to display a control center. A related object of the present invention is to provide a platform that is capable of hiding the control center within the conference table when the control center is not being used.

Another object of the present invention is to provide a platform that enables rotation with respect to the conference table to display or hide the control center. A related object of the present invention is to provide a platform that enables rotation with respect to the conference table without disrupting the electrical of communication cords feeding the control center. Another related object of the present invention is to provide a platform that enables the control center to be activated during rotation of the control center with respect to the conference table.

Another object of the invention is to provide a platform that is designed to be indistinguishable from the top of the conference table when the control center is not in use.

Still another object of the invention is to provide a roll over platform that is a available to each individual that is present around the conference table at the meeting.

Still another object of the invention is to provide a platform that is safe and easy to use and economical to manufacture.

A further object of the invention is to provide a control center which permits changes to the particular plugs, lines, screens and other ports mounted in the control center without removing the roll over control center assembly from the table.

In conjunction with the foregoing object, a further object is to permit the addition or deletion of the various ports, lines, plugs, screens and the like by removing the face plate and exchanging the face plate after the changes have been made thereby avoiding the necessity of removing the platform from the table.

Other objects of the present invention will become more apparent to persons having ordinary skill in the art to which the present invention pertains from the following description taken in conjunction with the accompanying drawings.

IV. SUMMARY OF THE INVENTION

The present invention is a roll over audio visual control center ("platform") that is designed to be embedded for use within the top of a conference table. The platform main parts: a housing and a control center. In the preferred embodiment, the housing is rectangular in shape and the control center is rectangular in shape and is secured within the hollow center of the housing by a hinge. The hinge enables the rotation of the control center within the hollow center of the housing and, thereby, permits the ability of the platform to display an electrical or communication means for use on top of the conference table or hide the electrical or communication means under the conference table when not in use.

V. BRIEF DESCRIPTION OF THE DRAWINGS

The description of the preferred embodiment will be better understood with reference to the following figures:

FIG. 1 is a side perspective view illustrating the roll over audio visual control center as embedded within the conference table and corresponding to each position at the conference table;

FIG. 2 is side cross-sectional perspective view of the roll over audio visual control center as embedded within the conference table;

Figure 5:
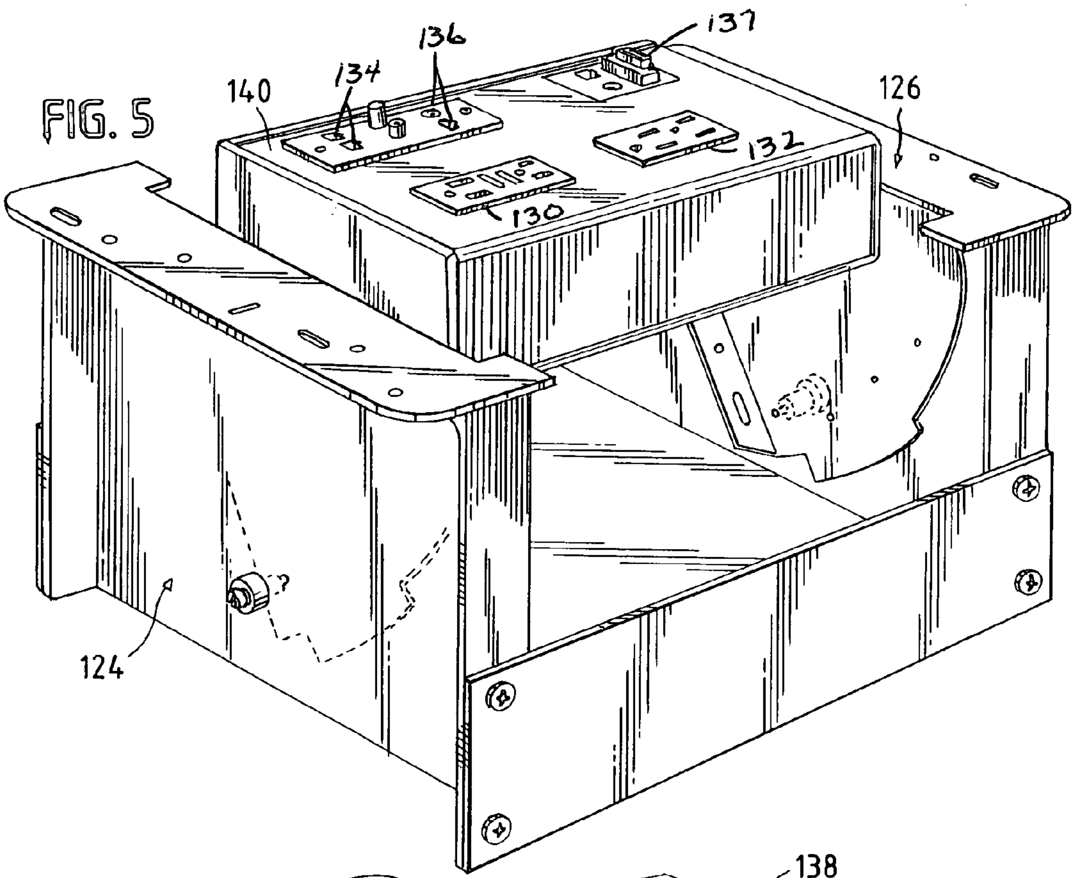
FIG. 5 is a side perspective view of the roll over audio visual control center which includes additional plugs and ports, such as dedicated computer circuit plugs, and dual pin fiber optic ports.
Figure 6:
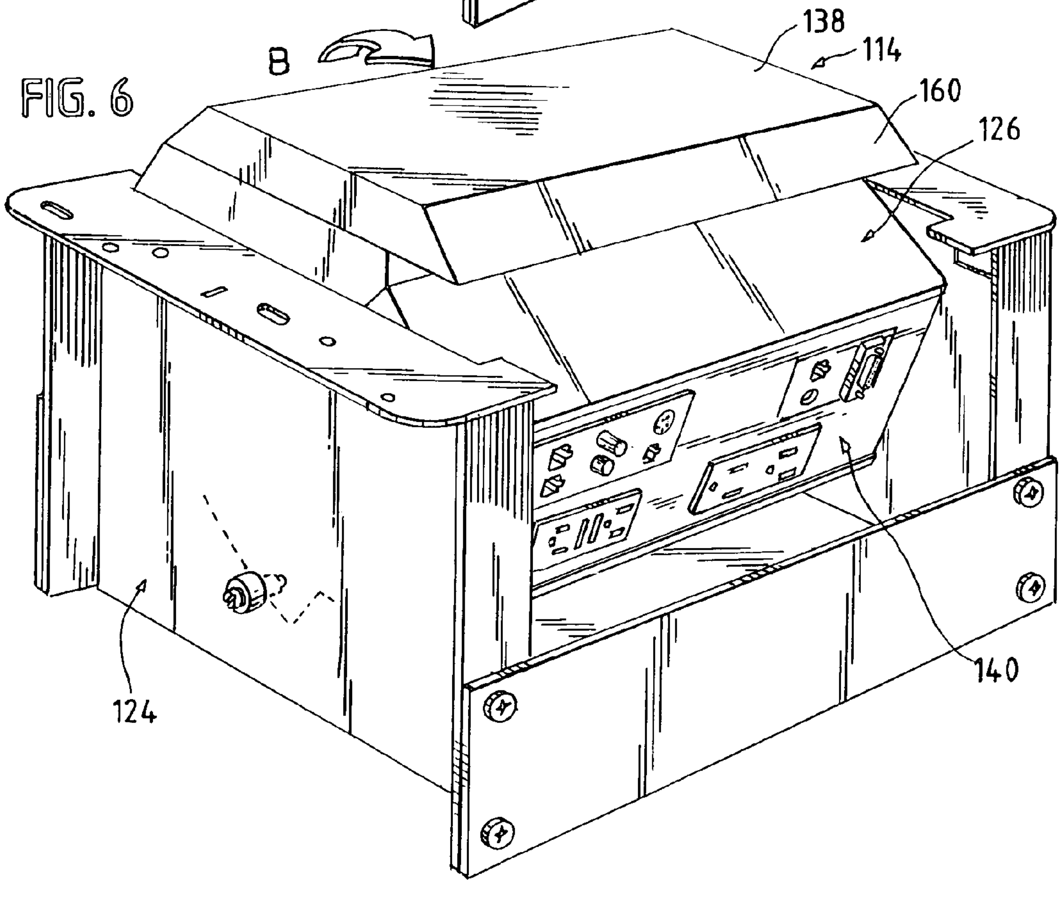
Figure 7:
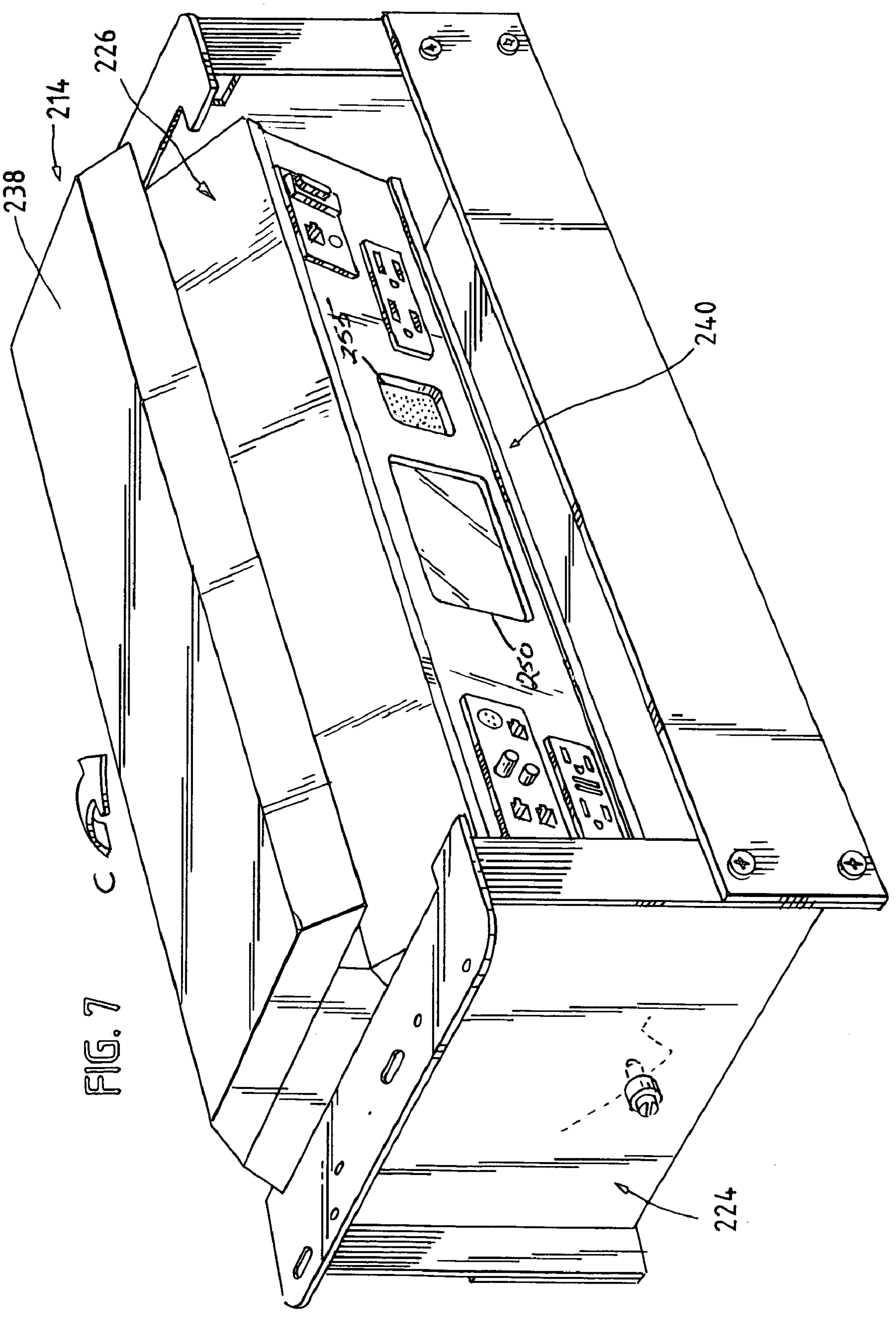

FIG. 6 is a side perspective view showing the roll over platform of FIG. 5 in its inverted rest position with the top panel now in registry with the top of the conference table, FIG. 7 illustrates still a further embodiment of the roll over audio visual control panel of the present invention which shows a further enlarged version incorporating a video screen of the type which may either be used for computers or audio visual teleconferencing.

VI. DETAILED DESCRIPTION OF THE PREFERRED EMBODIMENT

Turning first to FIG. 1, there is illustrated a conference table 10. As a non-limiting example, the conference table 10 is illustrated as being ovid in shape. Alternatively, any shape of the conference table 10 is sufficient which includes but is not limited to square, rectangular, circle, triangular, etc. . . . The conference table 10 has a top 12 which is embedded with a plurality of roll over audio visual control centers ("roll over platforms") 14. The number of the roll over platforms 14 may correspond to the number of chairs 16 that fits around the exterior circumference of the top 12 of the conference table 10 and is, therefore, a variable number that depends upon the shape of the conference table 10. Preferably, each of the roll over platforms 14 is equally spaced a distance 18 from the exterior circumference of the top 12 of the conference table 10 to form an interior circumference 20 that mirrors the exterior circumference of the top 12 of the conference table 10. In the preferred embodiment and as discussed in further detail below, the distance 18 is sufficient to permit efficient use of the roll over platform 14 by an individual in one of the chairs 16. Preferably, each of the roll over platforms 14 is equally spaced a separation distance 22 from adjacent roll over platforms 14 along the interior circumference 20 of the roll over platforms 14 to allow room for each seated individual.

Turning to FIG. 2, the roll over platform 14 is more clearly illustrated as embedded into the top 12 of the conference table 10. The roll over platform 14 has a housing 24 and a control center 26. Preferably, the housing 24 is rectangular in shape and has housing sides 28*a*, 28*b*, separated by a housing width 30, and the control center 26 has a control center width 32 which is substantially equal to the housing width 30. In an alternate embodiments, the shape of the housing 24 and the shape of the control center 26 may be any other shape including but not limited to square, circular, ovid, triangular, etc . . . , provided that the shape of the housing 24 and the shape of the control center 26 enable rotation of the control center 26 within the housing 24.

As indicated above, the roll over platform 14 is embedded into the top 12 of the conference table 10. In the preferred embodiment, this means that the housing 24 is secured to the underside of the top 12 of the conference table 10. The housing 24 may be secured to the top 12 by any means known by a person skilled in the art. This includes but is not limited to screws or bolts. Alternatively, the housing 24 may be integrally molded into the top 12 of the conference table 10 or built or designed into the top 12 of the conference table 10 provided the housing 24 coacts with the control center 26 for the proper and efficient use of the roll over platform 14 by the individual at the conference table 10. The housing 24 may be made of any type of material sufficient to be secured within the top 12 of the conference table 10.

Figure 3A:
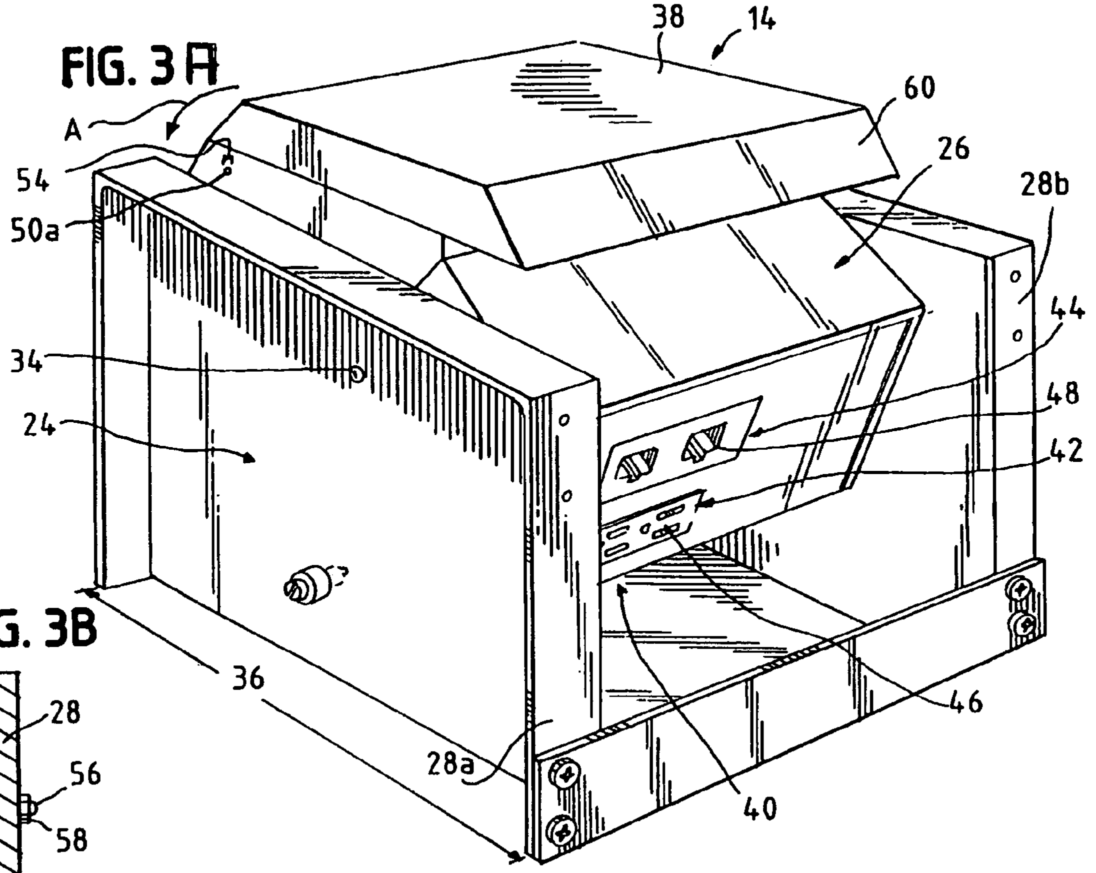
FIG. 3A is a side perspective view illustrating the roll over audio visual control center situated in the regular position within the conference table.

FIG. 3A illustrates the interaction of the control center 26 with the housing 24 for the proper and efficient use of the roll over platform 14. The control center 26 is secured to the housing 24 by a pivot hinge 34. Preferably, the pivot hinge 34 is centrally located within the control center 26. This central location of the pivot hinge 34 enables the control center 26 to be easily rotated between a use position and a rest position within the housing 24.

Figure 4:
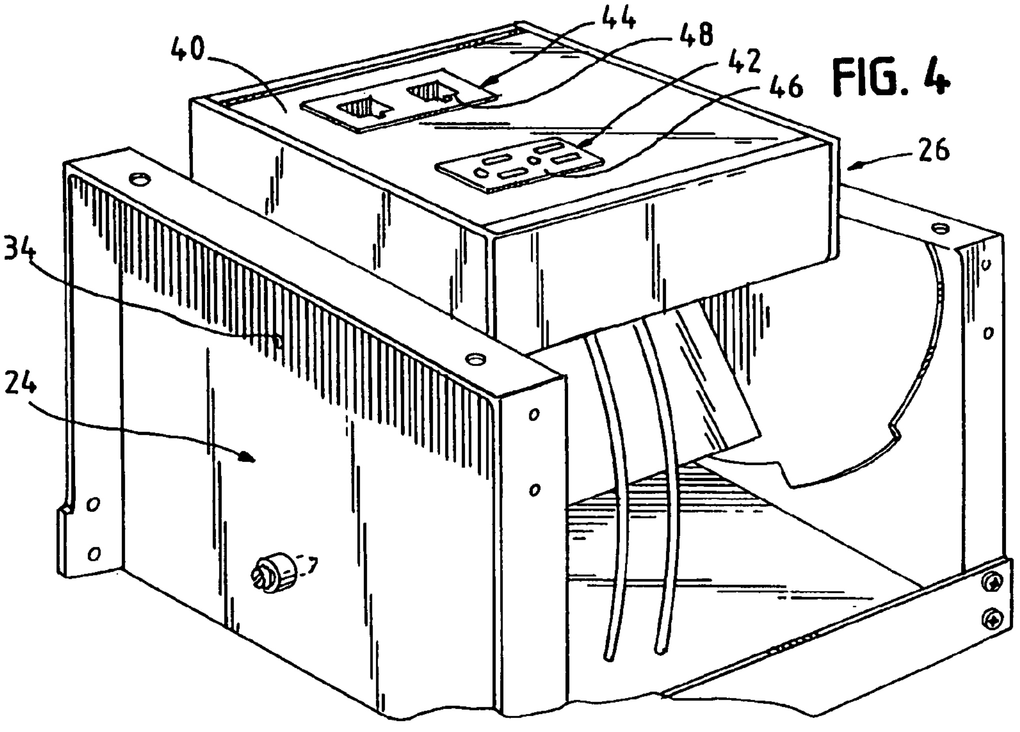
FIG. 4 is a side perspective view of the roll over audio visual control center situated in the inverted use position within the conference table.

The roll over platform 14 has two positions: a regular position and an inverted position. In the regular rest position, the roll over platform 14 has a control center 26 has a top surface 38 that is blended with or camouflaged with the color scheme or design of the top 12 (FIG. 1) of the conference table 10. In this regular rest position, the top surface 38 of the control center 26 is flat and remains flush with the top 12 of the conference table 10 and provides the same use as the top 12 of the conference table 10. Upon depression of the top surface 38 of the control center 26 at the inner edge 27 thereof, the roll over platform 14 begins to rotate about the pivot hinge 34 in the direction of Arrow A. After a rotation greater than ninety degrees (90°) and less than one hundred and eighty degrees (180°), the roll over platform 14 reaches the inverted position as illustrated in FIG. 4, such that the control center 26 has a bottom surface 40 which becomes flush with the top 12 of the conference table 10 and the top surface 38 of the control center 26 becomes the bottom surface. In this inverted use position, the bottom surface 40 provides a power outlet 42 and a communication outlet 44 by an individual at the conference table 10.

Preferably, the power outlet 42 consists of a plurality of electrical sockets 46. The electrical sockets 46 are sufficient to provide electrical power to computer equipment in use by an individual at the conference table. Such uses include but is not limited to hand-held computers, laptop computers, printers, hand-held personal telephones, or lights such as lamps. The power outlet 42 is powered electronically by corresponding electrical cords 62 (FIG. 4) for each of the plurality of electrical sockets 46.

Preferably, the communication outlet 44 consists of a plurality of telephone sockets 48. The telephone sockets 48 are sufficient to provide an individual at the conference table with immediate access to and including but not limited to local area networks and/or a globalized communications system that connects groups of computers (the "internet") via the individual's computer equipment or telephone access for a discussion with other individuals elsewhere or to establish conference calls with other groups of individuals. The communications outlet 44 establishes communication through corresponding telephone cords 64 (FIG. 4) for each of the plurality of telephone sockets 48.

Alternatively, the control center 26 may provide the user with any other type or form of power outlet 42, communications outlet 44, or any other type or form of outlet that an individual at a conference table might conceivably use or require at a meeting. As illustrated in FIGS. 5–7 of the drawings, the roll over platform may be modified or enlarged to include several other types of ports. These ports may include dual pin fiber optics, additional telephone lines, computer ports, printer ports, audio ports and other types of equipment used in teleconferencing. It is contemplated that the ultimate customer would dictate the types of equipment which would be required by such a customer, and the roll over platform is built to those specifications. This would dictate the sizing of the roll over control center as well as the individual ports, plugs, lines and the like which are incorporated therein.

As shown in FIG. 5, an enlarged housing 124 is provided with an enlarged control center 126. A pair of standard 110 volt dual plugs 130 are shown along with a second pair of 110 volt plugs 132 which are dedicated circuits for a computer and the like. There is also shown a pair of telephone lines 134 as well as a dual pin fiber optic ports 136. A separate port 137 is provided for equipment such as a computer printer or the like. A face plate 140 is provided which is provided with multiple apertures required to have all of the various ports and plugs installed therein. The face plate 140 is held into position by screws or by other mechanical means, which are mounted from the underside of the control center 126 (not shown) and from which all of the various electrical cords and lines exit. The cords and electrical lines may be cabled together and then would enter a raceway located under the conference table 10 in a manner commonly known. The cables would be designed to enter into an opening in the floor or other appropriate opening and run all the way to the ultimate power source. For example, a separate cabinet or a room could be provided and all of the cables run to the cabinet or the room wherein the ultimate power sources are located. In this manner, none of the power sources would be visible or available within the area of the conference table and would be kept out of sight. Further, the face plate of the control center 126 could easily be replaced by simply unscrewing the screws or disengaging the mechanical means, holding the face plate in position, and removing whichever sockets or lines or ports are desired, and inserting additional ports or alternate ports as may be desired by a customer. The face plate may be designed to accommodate such ports, and simply screwed or mounted back into position.

As shown in FIG. 6, the control center 126 as illustrated in FIG. 5 is shown inverted in the direction of arrow B into its inverted or non-use position with the control center 126 rotated out of position and in its rest position. The control center 126 is provided with a top 138 which blends with the tabletop in this position and is therefore out of view and capable of being used as part of the conference table 10 by those sitting around the table.

FIG. 7 illustrates still another embodiment of the roll over control center of the present invention which is even more enlarged. This particular embodiment shows a housing 224 containing an enlarged control center 226 which similarly includes the various ports and plugs, telephone lines, dual pin fiber optic ports, printer ports and the like as illustrated in connection with FIGS. 5 and 6. In addition, however, this control center is further provided with a video screen 250 and a microphone 255. The particular roll over control center 226 as illustrated in FIG. 7 is therefore capable of providing teleconferencing with both audio and visual capability for the persons sitting around the conference table. This unit is further designed to have a top 238 which again, is flush with the conference table top 10 when rolled in the direction of arrow C to its inverted non-use rest position.

As was indicated in connection with the embodiment shown in FIG. 7, the control center 226 includes a face plate 240 which may be held in position by screws which pass from a bottom plate to hold it to the face plate 240 in position. The entire face plate may be therefore, removed and changed to include other ports, lines, screens, plugs, or any other type of port which may be dictated as newer equipment and additional technologies developed. Once again, all of the necessary electrical lines and cords exit from the bottom of the unit, and may be cabled together to enter into a raceway and again exit to a convenient cabinet or room where the ultimate power sources are located.

The manner in which the roll over platform operates is similar with respect to the embodiment shown in FIGS. 2–7. The roll over platform 14 uses a securing means by which it can effectively secure the roll over platform 14 into the regular position or the inverted position as the roll over platform 14 rotates between these two positions. It will be clear that the control center assembly is designed to rotate the platform between a use position and a non-use or rest position.

In the securing means, the control center 26 has a recess 50*a*, 50*b* and 52*a*, 52*b* (not shown), each with a recess width 54. Recess 50 and 50*b* are located on opposite sides of the control center 26 from recess 52*a* and 52*b*. Preferably, the recess 50*a*, 50*b* and 52*a* and 52*b* are located on the control center 26 in the direction of and adjacent to the housing sides 28*b* and 28*a*, respectively, between the top surface 38 and the bottom surface 40. Alternatively, the securing means may consist of recess 50*a* and 50*b* only and one latch 56.

Figure 3B:
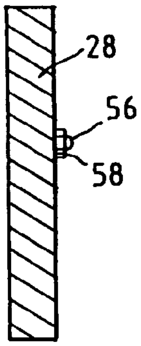
FIG. 3B is a side partial cross-sectional view of the securing means for the roll over audio visual control center located within the housing.

Turning to FIG. 3B, the housing 24 has a latch 56 that extends outwardly or perpendicular from the housing side 28*a* and side 28*b* toward the control center 26. In the regular position, the latch 56 is releasably retained within the recess width 58 of the recess 50*b*. Upon pressure from the depression of the control center 26 to rotate the roll over platform 14 from the regular position to the inverted position, the latch 56 is released from the recess 50*b*. After removal from the recess 50*b*, the control center 26 contacts the latch 56 to move the latch 56 from an extended position, extending outwardly from the housing 24, to a depressed position located within a cavity 58 of the housing 24. In this depressed position, the latch 56 is depressed into the cavity 58 until the control center 26 is rotated sufficiently away from contact with the housing 24 and the latch 56. The depression of the latch 56 into the cavity 58 prevents the latch 56 from inhibiting in any manner the rotation of the control center 26 from the regular position. As the roll over platform 14 reaches the inverted position, the control center 26 engages the latch 56 to again depress the latch 56 from the extended position to be releasably retained by the recess 50*a*. Once the latch 56 is retained by the recess 50*a*, the control center 26 stops rotating along the pivot hinge 34 and is effectively positioned into the inverted position. The same principles and dynamics apply as the roll over platform 14 is rotated from the inverted position back to the regular position.

In addition, the assembly is further provided with positive stops to ensure that upon rotation of the platform 14 from the inverted position to the regular position, the platform 14 stops in the proper position. For purposes of explanation, similar reference numerals will be used in connection with each of the embodiments as depicted in FIGS. 3–7. As shown therein, it will be observed that the housing 24, 124, 224, each is provided with a stop flange 51 located at each of the four interior corners of the house. It will also be observed that the control center 26, 126, 226 is provided with opposed side walls 53 which extend down from the control center 26. Each of the side walls includes a pair of opposed stop shoulders 55, 155 which co-act with the stop flanges 51. It will be observed that when the control center 26 is rotated to the use position as shown in FIG. 4, the forward stop shoulder 55 will abut against the stop flange 51. The positioning of the stop shoulder 55 relative to the stop flange 51 is designed such that a positive stop position is reached when the control center 26 is in the use position. Similarly, when the control center is rotated in the reverse direction to expose the top 14, the opposed stop shoulder 55 will rotate backwardly and abut against the rear stop flange 51 which is so positioned such that the platform 14 will be in the precise rest position as shown in FIG. 3. It will be observed in FIGS. 5, 6 and 7, that each of the roll over assemblies shown therein includes a similar positive stop mechanism for ensuring that the roll over control center when rotated, will stop exactly in the use position in one case, and in the rest position in the other case.

In use then, the roll over platform 14 is rotated from the regular position to the inverted position to enable use of the power outlet 42 and/or communication outlet 44 by an individual at the conference table 10. When the use of the power outlet 42 and/or communication outlet 44 is no longer desired, the roll over platform 14 is rotated from the inverted position back to the regular position to remove the power outlet 42 and communication outlet 44 from visibility and to retain these outlets within the conference table 10 for subsequent later use.

Thus, there has been provided a roll over platform to effectively provide a control center for use by an individual at a conference table. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A roll over control center assembly adapted for incorporation within a table top surface and accommodating a rotational movement of the control center within a use position and a rest position, comprising;

a housing having opposed side walls, a partial front wall and a partial back wall, said housing defining a hollow interior, a control center formed by opposed side walls and a control platform carried between said opposed side walls, said control center having a shape and being sized to fit within the hollow interior of said housing and being hinged to said housing such that said control center is rotatable within said housing between a use position and a rest position, at least one latch interposed between said housing and said control center to alternately releasably latch said control center in said use position and in said rest position, and said control center provided with a flat surface matching said table top surface, said flat surface being in alignment with said table top surface when said control center is rotated to the rest position, and said control center is in a use position when rotated in the reverse direction.

2. The roll over control center assembly as set forth in claim 1 above, wherein said control center includes a control panel adapted to carry a plurality of electrical and electronic plugs, pin ports, telephone jacks, computer ports, electrical plugs and audio ports, each having electrical cord connections to a master power source, said control panel being removeably engaged to said control center to accommodate the addition and deletion to any number of plugs, pin ports, electrical plugs, and audio ports without requiring the removal of said control center from the table incident to the addition or deletion process.

3. The roll over control center assembly as set forth in claim 2 above, wherein said partial front wall and partial back wall of said housing is spaced from said control center to allow for the passage therebetween of all said electrical cords.

4. The roll over control center assembly as set forth in claim 2 above, wherein said control panel further includes audio and visual electronic means to allow for video and audio displays for each control center and the occupant utilizing the same.

5. The roll over control center assembly as set forth in claim 1 above, wherein said roll over platform assembly is further provided with securement means for securing said control center in the use position and the rest position, said securement means comprising at least one latch position in a side wall of said housing the control center provided with a pair of spaced recesses which co-act with said latch, whereby rotation of the control center to the rest position allows said latch to engage one recess to engage the assembly with the control center exposed, while rotation to the rest position causes the latch to engage the opposed recess to latch the roll over assembly in the rest position with the flat surface in registry with the tabletop surface.

6. A roll over control center assembly as set forth in claim 1 above, wherein said roll over platform assembly is further provided with stop means for stopping the rotational movement of said control center relative to said housing, said stop means formed by the housing having stop flanges formed along each opposed side wall thereof and extending inwardly therefrom a short distance along all the interior corners, and said control center having opposed side walls, each side wall provided with opposed stop shoulders which are positioned to co-act with said stop flanges such that rotation of said control center to the rest position causes one of said stop shoulders to abut said stop flange when the rest position is reached, and rotation to the use position will cause the opposed stop shoulder to abut the opposed stop flange when the use position is achieved.

7. The roll over control center assembly as set forth in claim 1 above, wherein said roll over platform assembly is provided with securement means for securing said control center in the use position and in the rest position, said securement means comprises at least one latch position in a side wall of said housing and the control center provided with a pair of spaced recessed which co-act with said latch, said roll over platform assembly further provided with stop means for stopping the rotational movement of said control center relative to said housing, said stop means formed by said housing having stop flanges formed along each of the opposed side walls and extending inwardly therefrom a short distance from each interior corner, said control center having opposed side walls, each side wall provided with opposed stop shoulders which are positioned to co-act with said stop flanges such that rotation of said control center to the rest position causes one of said stop shoulders to abut said stop flange when the rest position is reached and rotation to the rest position will cause the opposed stop shoulder to abut the opposed stop flange when the use position is reached, said stop means and said securement means being designed to co-act with each other such that said latch will engage the appropriate recess when the stop means causes the rotational movement of said control center to stop in the use position and latch the same in place, and the reverse rotation will cause said stop means to stop the rotational movement of said control center when the rest position is achieved and the latch then engages the corresponding recess in the rest position.

8. The roll over control center assembly as set forth in claim 1 above, wherein said control center is formed by a face plate provided with a plurality of apertures to accommodate a plurality of electronic and electrical ports and plugs therein, said face plate being releasably engagable from said control center to allow for repairs and replacement of ports as desired without necessitating removal of said roll over assembly from the table.

9. A roll over control center assembly adapted for a corporation within a table top surface comprising;

a housing having opposed side walls, at least a partial front wall and at least a partial back wall, said housing defining a hollow interior, a control center assembly formed by opposed side walls carrying a control platform therebetween and further carrying a flat top surface in spaced relation to said control platform, said control center having a shape and being sized to fit within the hollow interior of said housing and being hinged to said housing side walls by a pair of hinges such that said control center is rotatable within said housing between a used position and rest position, said control center having a face plate containing a plurality of openings to accommodate a mounting therein of a plurality of electronic and electrical plugs and ports, whereby rotation of said roll over control center to the rest position brings said flat top surface in registry and in alignment with the table top and hides said control center from view and rotation of said roll over control center in the opposite direction to the use position brings said control center to an exposed use position to allow the electronic and electrical plugs and ports to be used by a table occupant.

10. The roll over control center assembly as set forth in claim 9 above, wherein said face plate is removably engaged to said control center to allow for ease of repair and removal of any of the electronic and electrical plugs and ports.

11. The roll over control center assembly as set forth in claim 9 above, wherein said roll over platform assembly is provided with securement means for securing said control center in the use position and in the rest position, said securement means comprising at least one latch positioned in a side wall of said housing, and the control center provided with a pair of spaced recesses which co-act with said latch, whereby rotation of said roll over center to the rest position allows said latch to engage one recess, while rotation to the use position causes the latch to engage the opposed recess to latch control center in the use position.

12. The roll over control center assembly as set forth in claim 9 above, wherein said roll over platform assembly is further provided with stop means for stopping the rotational movement of said control center relative to said housing, said stop means formed by said housing being provided with stop flanges formed along each opposed side wall thereof and extending inwardly therefrom a short distance at each of the opposed four interior corners, and said control center having opposed side walls, each side wall provided with opposed stop shoulders which are positioned to co-act with said stop flanges such that rotation of said control center to the rest position causes one of said stop shoulders to abut said stop flange when the rest position is reached and rotation to the use position will cause the opposed stop shoulder to abut the opposed stop flange when the use position is reached.

13. The roll over control center assembly as set forth in claim 9 above, wherein said roll over platform assembly is further provided with securement means for securing control center in the use position and in the rest position, said securement means comprises at least one latch positioned in a side wall of said housing and the control center provided with a pair of spaced recesses with co-act with said latch, whereby rotation of the control center to the rest position allows said latch to engage one recess while rotation to the use position causes the latch to engage the opposed recess to latch said control center in the rest position, and said roll over control center assembly further provides stop means for stopping rotational movement of said control center relative to said housing, said stop means formed by housing provided with stop flanges formed along each opposed side wall extending inwardly therefrom a short distance at each of the interior corners, said control center having a opposed side walls, each side wall provided with opposed stop shoulders which are positioned to co-act with said stop flanges such that rotation of said control center to the rest position causes one of said stop shoulders to abut said stop flange when the rest position is reached and rotation to the use position will cause the opposed stop shoulder to abut the opposed stop flange when the use position is reached, said securement means and said stop means being designed to co-act with one another such that rotational movement of the control center to the use position will cause the latch to engage the appropriate recess when the stop shoulder abuts against one of the stop flanges, and rotation to the rest position will cause the latch to engage the opposed recess when the opposed stop shoulder has abutted against the opposed stop flange.

14. The roll over control center assembly as set forth in claim 9 above, wherein said control center is further provided with video and audio devices to allow for global and local teleconferencing and televideoing..

* * * * *